(12) United States Patent
Snider et al.

(10) Patent No.: US 12,358,349 B2
(45) Date of Patent: Jul. 15, 2025

(54) VEHICLE WINDOW ASSEMBLY WITH BONDED PERIMETER FRAME

(71) Applicant: Magna Mirrors of America, Inc., Holland, MI (US)

(72) Inventors: Darin J. Snider, Holland, MI (US); David L. Guillozet, Hamilton, MI (US); Michael J. Hulst, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 330 days.

(21) Appl. No.: 17/935,628

(22) Filed: Sep. 27, 2022

(65) Prior Publication Data

US 2023/0094469 A1  Mar. 30, 2023

Related U.S. Application Data

(60) Provisional application No. 63/261,839, filed on Sep. 30, 2021.

(51) Int. Cl.
*B60J 1/00* (2006.01)
*B60J 1/10* (2006.01)
*B60J 1/18* (2006.01)

(52) U.S. Cl.
CPC ............. *B60J 1/007* (2013.01); *B60J 1/006* (2013.01); *B60J 1/10* (2013.01); *B60J 1/18* (2013.01)

(58) Field of Classification Search
CPC ..... B60J 1/007; B60J 1/006; B60J 1/10; B60J 1/18
See application file for complete search history.

(56) References Cited

U.S. PATENT DOCUMENTS

| | | | |
|---|---|---|---|
| 4,139,234 A * | 2/1979 | Morgan | B60J 1/10 160/371 |
| 5,551,197 A | 9/1996 | Repp et al. | |
| 5,853,895 A | 12/1998 | Lewno | |
| 6,134,851 A * | 10/2000 | Roze | B60J 10/70 52/204.67 |
| 6,691,464 B2 | 2/2004 | Nestell et al. | |
| 6,832,457 B2 | 12/2004 | Geiger | |
| 6,869,128 B2 | 3/2005 | Farrar et al. | |
| 6,920,719 B2 | 7/2005 | Bourque et al. | |
| 7,003,916 B2 | 2/2006 | Nestell et al. | |
| 7,059,656 B2 | 6/2006 | Mikkaichi et al. | |

(Continued)

FOREIGN PATENT DOCUMENTS

WO   2021246324 A1   12/2021

*Primary Examiner* — Michael Zhang
(74) *Attorney, Agent, or Firm* — HONIGMAN LLP

(57) ABSTRACT

A vehicular window assembly includes a window panel having an inner side and an outer side separated from the inner side by a thickness of the window panel. The window panel has a perimeter edge that spans between the inner side and the outer side. A perimeter frame includes a plastic inner frame portion and a polymeric outer frame portion disposed at an outer surface of the inner frame portion. The inner frame portion has an attaching element that is adhesively bonded at the inner side of the window panel to attach the perimeter frame to the window panel. With the attaching element adhesively bonded at the inner side of the window panel, the outer frame portion receives and seals against the perimeter edge of the window panel.

22 Claims, 2 Drawing Sheets

(56) References Cited

U.S. PATENT DOCUMENTS

| | | | |
|---|---|---|---|
| 7,073,293 B2 | 7/2006 | Galer |
| 7,125,067 B2 | 10/2006 | Bonnett et al. |
| 7,153,380 B2 | 12/2006 | Ash et al. |
| 7,188,659 B2 | 3/2007 | Hansen et al. |
| 7,188,885 B2 | 3/2007 | Schlater et al. |
| 7,354,093 B2 | 4/2008 | Wato et al. |
| 7,383,662 B2 | 6/2008 | Tamaoki |
| 7,560,157 B2 | 7/2009 | Kasahara et al. |
| 7,588,819 B2 | 9/2009 | Saimi |
| 7,628,947 B2 | 12/2009 | Caldoro et al. |
| 7,637,554 B2 | 12/2009 | Kurokawa et al. |
| 7,641,265 B2 | 1/2010 | Seiple et al. |
| 7,730,668 B2 | 6/2010 | Dankert et al. |
| 7,735,897 B2 | 6/2010 | Seiple et al. |
| 7,874,104 B2 | 1/2011 | Kimoto et al. |
| 7,950,716 B2 | 5/2011 | Schlater et al. |
| 7,963,070 B2 | 6/2011 | Recker |
| 8,015,762 B2 | 9/2011 | Krahn |
| 8,028,489 B1 | 10/2011 | Lawrence |
| 8,033,057 B2 | 10/2011 | Krause et al. |
| 8,033,597 B2 | 10/2011 | Griffis et al. |
| 8,042,303 B2 | 10/2011 | Gandhi |
| 8,146,645 B2 | 4/2012 | Pulcini et al. |
| 8,175,769 B2 | 5/2012 | Perrin et al. |
| 8,192,671 B2 | 6/2012 | Coldre et al. |
| 8,215,370 B2 | 7/2012 | Erdahl |
| 8,272,168 B2 | 9/2012 | Lahnala |
| 8,312,681 B2 | 11/2012 | Mouton |
| 8,322,075 B2 | 12/2012 | Lahnala |
| 8,402,695 B2 | 3/2013 | Smith et al. |
| 8,495,841 B2 | 7/2013 | DeGroff |
| 8,561,353 B2 | 10/2013 | Terai et al. |
| 8,613,171 B2 | 12/2013 | Dudash |
| 8,631,607 B2 | 1/2014 | Broadhead et al. |
| 8,667,739 B2 | 3/2014 | Brookman |
| 8,695,292 B2 | 4/2014 | Recker |
| 8,776,435 B2 | 7/2014 | Hulst |
| 8,782,956 B2 | 7/2014 | Giroux |
| 8,790,562 B2 | 7/2014 | Sitterlet et al. |
| 8,829,539 B2 * | 9/2014 | Kleo ............... B32B 17/10036 438/31 |
| 8,845,841 B2 | 9/2014 | Okamoto et al. |
| 8,881,458 B2 | 11/2014 | Snider et al. |
| 8,931,821 B2 | 1/2015 | Ackerman et al. |
| 8,959,872 B2 | 2/2015 | Ayres et al. |
| 9,090,152 B2 | 7/2015 | Yoshimoto |
| 9,114,870 B2 | 8/2015 | Chaumel et al. |
| 9,126,474 B2 | 9/2015 | Cicala |
| 9,168,723 B2 | 10/2015 | Galant |
| 9,216,633 B2 | 12/2015 | Payne |
| 9,421,848 B2 | 8/2016 | Trupiano |
| 9,475,370 B2 | 10/2016 | Snider et al. |
| 9,493,061 B2 | 11/2016 | Goto et al. |
| 9,528,315 B2 | 12/2016 | Kim |
| 9,623,731 B2 | 4/2017 | Ikeda et al. |
| 10,011,158 B2 | 7/2018 | Tooker et al. |
| 10,011,159 B1 | 7/2018 | Salter et al. |
| 10,023,026 B2 | 7/2018 | Snider et al. |
| 10,167,664 B2 | 1/2019 | Pretzer et al. |
| 10,239,397 B2 | 3/2019 | Snider et al. |
| 10,266,037 B2 | 4/2019 | Hulst et al. |
| 10,315,349 B2 | 6/2019 | Krueger et al. |
| 10,323,448 B2 | 6/2019 | Koette et al. |
| 10,369,868 B2 | 8/2019 | Takahashi et al. |
| 10,427,511 B2 | 10/2019 | Blottiau |
| 10,434,844 B2 | 10/2019 | Tooker et al. |
| 10,480,243 B2 | 11/2019 | Rafter et al. |
| 10,556,489 B2 | 2/2020 | Lewis et al. |
| 10,639,980 B2 | 5/2020 | Yajima et al. |
| 10,689,896 B2 | 6/2020 | Iglesias Sedano et al. |
| 10,807,445 B2 | 10/2020 | Tooker et al. |
| 10,927,582 B2 | 2/2021 | Veca et al. |
| 11,110,780 B2 | 9/2021 | Huttel et al. |
| 11,117,455 B2 | 9/2021 | Roux et al. |
| 11,260,736 B1 | 3/2022 | Stafievsky et al. |
| 11,279,066 B2 | 3/2022 | Stricher et al. |
| 12,077,035 B2 * | 9/2024 | Hick ............... B32B 17/10036 |
| 2003/0213179 A1 | 11/2003 | Galer |
| 2004/0020131 A1 | 2/2004 | Galer et al. |
| 2006/0107600 A1 | 5/2006 | Nestell et al. |
| 2008/0127563 A1 | 6/2008 | Tooker |
| 2019/0389293 A1 | 12/2019 | Scott |
| 2019/0390021 A1 | 12/2019 | Goto et al. |
| 2020/0139792 A1 | 5/2020 | Agemi et al. |
| 2020/0307363 A1 | 10/2020 | Carnoy et al. |
| 2021/0206243 A1 | 7/2021 | Jeon et al. |
| 2022/0144055 A1 | 5/2022 | Bergmann et al. |

* cited by examiner

VEHICLE WINDOW ASSEMBLY WITH BONDED PERIMETER FRAME

CROSS REFERENCE TO RELATED APPLICATION

The present application claims the filing benefits of U.S. provisional application Ser. No. 63/261,839, filed Sep. 30, 2021, which is hereby incorporated herein by reference in its entirety.

FIELD OF THE INVENTION

The present invention relates to window assemblies for vehicles and, more particularly to a side or rear window assembly for a vehicle.

BACKGROUND OF THE INVENTION

It is known to provide a window assembly for an opening of a vehicle, such as a side window assembly for a side opening of a vehicle. Conventional side openings of sports cars or the like may have an encapsulation molded around or along a periphery of the glass window panel.

SUMMARY OF THE INVENTION

A vehicular window assembly comprises a window panel and a perimeter frame. The perimeter frame comprises an inner frame portion and an outer frame portion. The inner frame portion comprises a plastic frame portion and the outer frame portion comprises a polymeric portion that is overmolded at an outer surface of the inner frame portion. The inner frame portion comprises an attaching element that is adhesively bonded at the inner side of the window panel to attach the perimeter frame to the window panel. With the attaching element adhesively bonded at the inner side of the window panel, the outer frame portion receives and seals against the perimeter edge of the window panel.

These and other objects, advantages, purposes and features of the present invention will become apparent upon review of the following specification in conjunction with the drawings.

DESCRIPTION OF THE PREFERRED EMBODIMENTS

Figure 1:
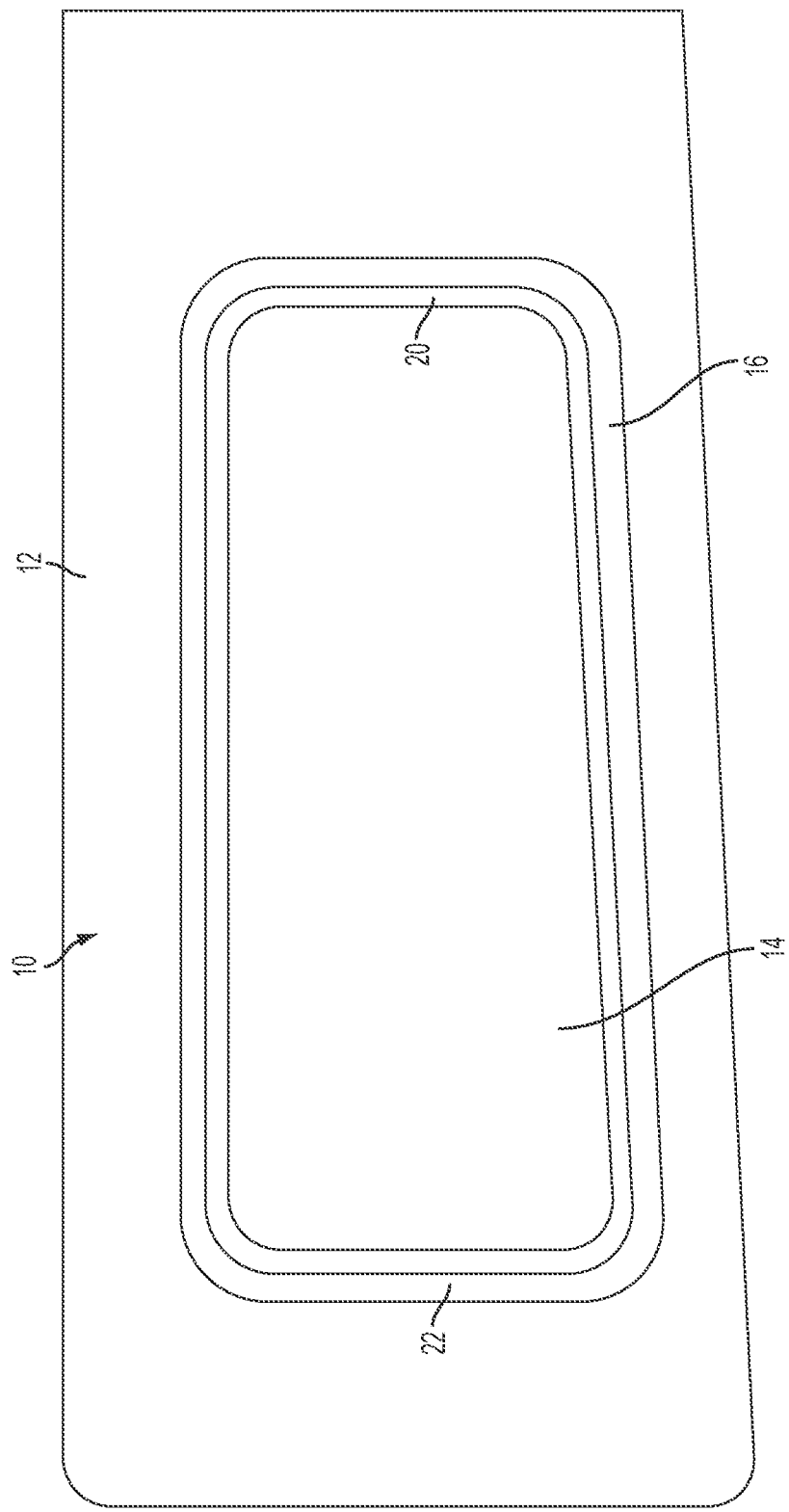
FIG. 1 is a side elevation view of a vehicular window assembly.
Figure 2:
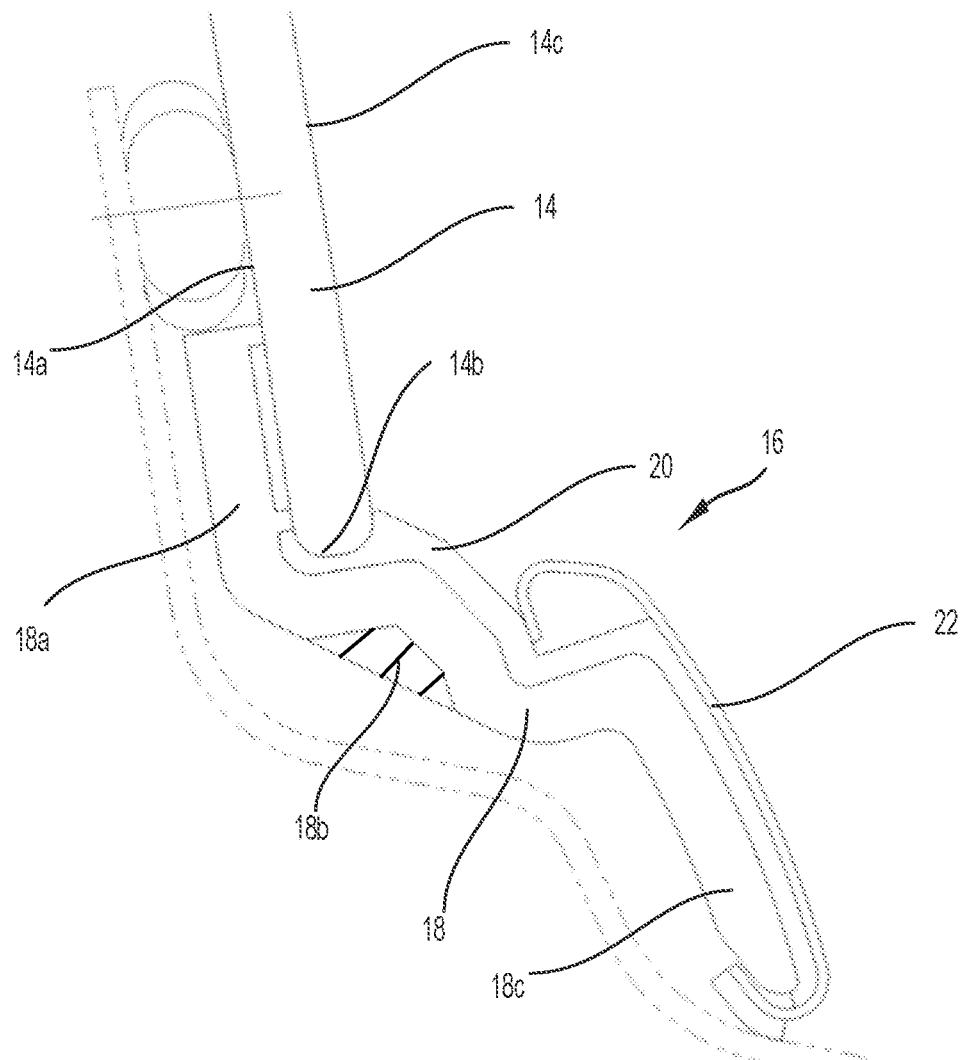
FIG. 2 is a sectional view of the vehicular window assembly of FIG. 1.

Referring now to the drawings and the illustrative embodiments depicted therein, a vehicular window assembly 10 (such as a window assembly configured for mounting at a side or rear portion of a vehicle 12) comprises a glass window panel 14 and a perimeter frame 16 that is adhesively bonded along at least one perimeter edge region of the glass window panel (FIG. 1). As shown in FIG. 2, the perimeter frame 16 includes a rigid plastic frame portion 18 and a softer polymeric outer frame portion 20 that is overmolded along a portion of the rigid plastic frame portion 18. The perimeter frame 16 may include a bezel element 22 (such as a plastic or metallic element) along an outer region of the perimeter frame 16. The frame portion 18 is configured to be adhesively bonded at the perimeter region of the inner surface 14a of the window panel 14, while the outer frame portion 20 engages the perimeter edge 14b of the window panel 14 and may overlap onto the perimeter region of the outer surface 14c of the window panel 14, as discussed below.

The frame portion 18 may comprise any suitably rigid or hard materials, and may be formed or molded out of a plastic or polymeric material (such as a polycarbonate or an acrylonitrile butadiene styrene (ABS) or polyethylene terephthalate (PET) material) or the like. The outer frame portion 20 may comprise a softer polymeric material (e.g., a rubber material or other suitable pliable or conformable sealing material). The outer frame portion 20 may be molded over and around the frame portion 18 and may be configured to receive the perimeter edges 14b and perimeter regions of the window panel 14 so as to receive or encompass the perimeter edge 14b and to seal the frame 16 at the perimeter edge(s) of the window panel 14. The perimeter frame 16 thus may have the outer frame portion 20 overmolded (or co-extruded or molded via a two-shot molding process) over and along and onto the outer surface of the frame portion 18.

As shown in FIG. 2, the inner frame portion 18 comprises an attaching portion 18a that is configured to engage the inner surface 14a of the window panel 14. The attaching portion 18a includes a recess and legs or ribs that establish the bond-line thickness of the adhesive disposed within and along the recess and between the inner surface 14a of the window panel and the attaching portion 18a. Thus, adhesive, such as an adhesive tape or a bead of adhesive, is disposed along the recess of the attaching portion 18a and the perimeter frame 16 is attached to the inner surface 14a of the window panel 14 when the adhesive and the attaching portion 18a engages the inner surface 14a of the window panel along the outer perimeter region of the window panel 14.

The inner frame portion 18, when attached to the window panel, extends along the perimeter region of the inner surface 14a of the window panel 14 and extends radially outward from the perimeter region of the window panel 14 (e.g., downward in FIG. 2). In the illustrated embodiment, the inner frame portion 18 is formed to generally correspond with the recessed shape of the sheet metal of the vehicle, and is configured to be attached to the vehicle when the window assembly is installed at the vehicle. The inner frame portion 18 is formed to have a generally uniform thickness, and thus may include a plurality of ribs or gussets 18b at the bends to strengthen the frame 16. The inner frame portion also includes an outward end portion 18c that is configured to have the bezel element 22 attached thereat to provide a desired outer appearance of the perimeter frame.

In other words, the inner frame portion 18 attaches to the inner surface 14a of the window panel along the perimeter region of the window panel and extends radially outward from the perimeter region of the window panel to provide an attachment interface between the vehicle and the window assembly. The inner frame portion 18 may be configured to correspond to a shape of the sheet metal or mounting region of the vehicle that receives the window assembly. Thus, the inner frame portion 18 may extend around the perimeter edge 14b of the window panel and away from an outer surface 14c of the window panel 14 so that the window panel 14 is recessed from the outward end portion 14c circumscribing the window panel 14. The inner frame portion 18 may include support structure, such as the ribs or gussets 18b, to provide strength and rigidity to the window frame 16.

As shown in FIG. 2, the softer outer frame portion 20 is molded along the outer surface or side of the inner frame portion 18 (i.e., the surface or side of the inner frame portion 18 facing away from the vehicle) and is shaped to receive and conform with the perimeter edge 14b of the window panel 14. The outer frame portion 20 thus may have a lip or portion that overlaps a small portion of the outer surface 14c of the window panel near the perimeter edge 14b (as shown in FIG. 2) or may be formed so as to not encroach onto the outer surface 14c of the window panel, depending on the particular application and desired appearance of the window assembly. Optionally, the softer outer frame portion 20 may be conformable to the perimeter edge 14b of the window panel 14 when the window frame 16 is attached at the window panel 14. With the inner frame portion 18 attached at the inner surface 14a of the window panel, the outer frame portion 20 thus provides a seal about the perimeter edge 14b of the window panel 14.

The bezel element 22 attaches at the outward end portion 18c of the inner frame 18 and a portion of the outer frame portion 20 may be disposed between the outward end portion 18c and the bezel 22. The bezel element 22 may extend from the edge of the frame 16 all the way to the outer surface 14c of the window panel 14, such that no portion of the outer frame portion 20 is exposed at the exterior of the vehicle, or the bezel may extend only partially between the edge of the frame and the window panel 14 so that at least a portion of the outer frame portion 20 is exposed.

Thus, the frame 16 may be formed via molding the inner frame portion 18 and then overmolding the outer frame portion 20 onto the inner frame portion 18. The formed frame 16 may then be positioned at the window panel 14 (such as along one or more perimeter edges of the window panel or around the periphery of the window panel). The attaching portion 18a (with adhesive disposed at the attaching portion or at the inner surface of the window panel) is positioned at and bonded to the inner surface 14a of the window panel 14, and the outer frame portion 20 receives and conforms to the perimeter edge 14b of the window pane 14l and seals against the perimeter edge 14b when the attaching portion 18a is bonded to the inner surface 14a of the window panel 14. The inner frame portion 18 is adhesively bonded to the inner surface 14a at the perimeter edge region of the glass panel 14 (with the outer frame portion 20 overlapping or encompassing the outer surface of the glass panel), such as by utilizing aspects of the window assemblies described in U.S. Pat. Nos. 5,853,895 and/or 5,551,197, which are hereby incorporated herein by reference in their entireties. The bezel element 22 may be attached at the frame before or after the inner frame portion 18 is bonded to the inner surface 14a of the window panel 14. The window assembly (with frame bonded at the inner surface of the window panel) is then adhered to and sealed at the sheet metal of the vehicle.

Thus, the window assembly provides a bonded perimeter frame that is bonded at the inner surface of the window panel. For large window panels (such as large side window panels), the large windows are expensive to encapsulate due to the large tool size needed to fixture the window and mold elements. The bonded perimeter frame allows for the frame to be formed separate from the window panel and then bonded onto the inner side of the glass panel, such that the frame does not encroach onto or overlap the outer surface of the window panel (or only slightly overlaps an edge region of the outer surface of the window panel).

The frame may include multiple pieces or portions that are separably attachable at discrete positions about the perimeter of the window panel to form a frame assembly, where each piece or portion includes a respective inner frame portion, outer frame portion, and bezel element. For example, a frame assembly may include upper and lower frame pieces for attaching at respective upper and lower edge regions of the window panel and side pieces for attaching at the respective side edge regions of the window panel between the upper and lower edge regions. Thus, the perimeter frame may entirely circumscribe or frame the window panel (i.e., the perimeter frame is disposed along the entirety of the perimeter region of the window panel). Optionally, the perimeter frame may only be disposed along a portion of the perimeter region of the window panel, such as only along one or more edges of the perimeter region. For example, the perimeter frame may be attached along the straight edges of the window panel, but not at the rounded corner regions of the window panel, where other sealing means may be used to attach and seal the window panel at the vehicle in the corner regions.

The window panel may comprise a glass window panel, such as transparent tempered glass window panel or the like. Optionally, the window panel may comprise a non-glass material, such as a transparent or substantially transparent plastic or polymeric or acrylic material or the like. Although shown and described as a fixed side window for a vehicle, the window assembly may be suitable for large or small fixed side windows or a rear window (such as a liftgate window such as for a hatchback vehicle or the like) or a top window, such as a sunroof or moonroof or the like.

Optionally, an opaque coating or frit layer may be established at the perimeter regions of the glass panel to substantially conceal or hide the portions of the frame that are disposed at the rear surface of the window panel. Optionally, the frit or paint or ink layer or coating may be disposed or screened onto a surface of the window panel after forming the glass panel. In applications where an opaque or non-transparent frit layer or other pattern or the like may be disposed at the surface of the window panel, the adhesive may comprise a substantially non-transparent adhesive. The opaque layer or frit layer may comprise a ceramic frit layer and may function to facilitate adhering or bonding of the perimeter frame (and optionally any hardware elements or brackets or hinges or the like) to the window panel. The frit layer may be substantially opaque, and thus may improve the overall appearance of the window assembly, since the bonding surfaces are not readily discernible or viewable through the glass panel and the frit layer. Examples of such frit layers are described in U.S. Pat. Nos. 5,853,895 and/or 5,551,197, incorporated above. The frit layer may be disposed onto the surfaces of the window panel in any desired pattern, such as stripes, dots, wave pattern or the like, to provide the desired appearance to the window panel, depending on the particular application of the window assembly.

The window assembly may utilize aspects of the window assemblies described in U.S. Pat. Nos. 11,260,736; 10,807,445; 10,434,844; 8,881,458; 8,402,695; 7,073,293; 7,003,916 and/or 6,691,464, and/or U.S. Publication Nos. US-2006-0107600; US-2008-0127563; US-2004-0020131 and/or US-2003-0213179, which are all hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular window assembly, the vehicular window assembly comprising:
   a window panel, wherein the window panel has an inner side and an outer side separated from the inner side by a thickness of the window panel, and wherein the window panel has a perimeter edge that spans between the inner side and the outer side;
   a perimeter frame comprising (i) a plastic inner frame portion, and (ii) a polymeric outer frame portion disposed at a first side of the inner frame portion;
   wherein the inner frame portion comprises a first material and the outer frame portion comprises a second material different from the first material;
   wherein the inner frame portion comprises an attaching element that is adhesively bonded at the inner side of the window panel to attach the perimeter frame to the window panel; and
   wherein, with the attaching element adhesively bonded at the inner side of the window panel, the outer frame portion receives and seals against the perimeter edge of the window panel.

2. The vehicular window assembly of claim 1, wherein the first material of the inner frame portion comprises an engineered plastic material.

3. The vehicular window assembly of claim 1, wherein the second material of the outer frame portion comprises a deformable material that conforms to the perimeter edge of the window panel when the attaching element is adhesively bonded at the inner side of the window panel.

4. The vehicular window assembly of claim 1, wherein a bezel element is attached at an edge region of the perimeter frame.

5. The vehicular window assembly of claim 1, wherein the outer frame portion is overmolded along the first side of the inner frame portion.

6. The vehicular window assembly of claim 1, wherein, when the vehicular window assembly is installed at a vehicle, a second side of the inner frame portion opposite the first side is adhesively bonded to an outer surface of the vehicle at a mounting region.

7. The vehicular window assembly of claim 6, wherein the second side of the inner frame portion is separated from the first side of the inner frame portion by a thickness of the inner frame portion, and wherein the inner frame portion comprises a uniform thickness between the second side and the first side.

8. The vehicular window assembly of claim 6, wherein the inner frame portion comprises a shape configured to correspond to the outer surface of the vehicle at the mounting region.

9. The vehicular window assembly of claim 1, wherein, when the perimeter frame is attached to the window panel, the perimeter frame is disposed along a perimeter region of the window panel and at least partially circumscribes the window panel.

10. The vehicular window assembly of claim 9, wherein, when the perimeter frame is attached to the window panel, the perimeter frame fully circumscribes the window panel.

11. The vehicular window assembly of claim 1, wherein the window panel comprises a glass window panel.

12. The vehicular window assembly of claim 1, wherein the vehicular window assembly comprises a vehicular side window configured to mount at a side portion of a vehicle.

13. A vehicular window assembly, the vehicular window assembly comprising:
   a window panel, wherein the window panel has an inner side and an outer side separated from the inner side by a thickness of the window panel, and wherein the window panel has a perimeter edge that spans between the inner side and the outer side;
   a perimeter frame comprising (I) a plastic inner frame portion, and (ii) a polymeric outer frame portion disposed at a first side of the inner frame portion;
   wherein the inner frame portion comprises a first material and the outer frame portion comprises a second material different from the first material;
   wherein the inner frame portion comprises an attaching element that is adhesively bonded at the inner side of the window panel to attach the perimeter frame to the window panel;
   wherein, with the attaching element adhesively bonded at the inner side of the window panel, the outer frame portion receives and seals against the perimeter edge of the window panel;
   wherein the second material of the outer frame portion comprises a deformable material that conforms to the perimeter edge of the window panel when the attaching element is adhesively bonded at the inner side of the window panel; and
   wherein, when the vehicular window assembly is installed at a vehicle, a second side of the inner frame portion opposite the first side is adhesively bonded to an outer surface of the vehicle at a mounting region.

14. The vehicular window assembly of claim 13, wherein the first material of the inner frame portion comprises an engineered plastic material.

15. The vehicular window assembly of claim 13, wherein a bezel element is attached at an edge region of the perimeter frame.

16. The vehicular window assembly of claim 13, wherein the outer frame portion is overmolded along the first side of the inner frame portion.

17. The vehicular window assembly of claim 13, wherein the second side of the inner frame portion is separated from the first side of the inner frame portion by a thickness of the inner frame portion, and wherein the inner frame portion comprises a uniform thickness between the second side and the first side.

18. The vehicular window assembly of claim 13, wherein the inner frame portion comprises a shape configured to correspond to the outer surface of the vehicle at the mounting region.

19. The vehicular window assembly of claim 13, wherein, when the perimeter frame is attached to the window panel, the perimeter frame is disposed along a perimeter region of the window panel and at least partially circumscribes the window panel.

20. The vehicular window assembly of claim 19, wherein, when the perimeter frame is attached to the window panel, the perimeter frame fully circumscribes the window panel.

21. The vehicular window assembly of claim 13, wherein the window panel comprises a glass window panel.

22. The vehicular window assembly of claim 13, wherein the vehicular window assembly comprises a vehicular side window configured to mount at a side portion of a vehicle.

* * * * *

UNITED STATES PATENT AND TRADEMARK OFFICE
CERTIFICATE OF CORRECTION

PATENT NO. : 12,358,349 B2
APPLICATION NO. : 17/935628
DATED : July 15, 2025
INVENTOR(S) : Darin J. Snider et al.

It is certified that error appears in the above-identified patent and that said Letters Patent is hereby corrected as shown below:

In the Claims

<u>Column 6</u>
Claim 13, Line 8, "(I) a plastic" should be --(i) a plastic--

Signed and Sealed this
Twelfth Day of August, 2025

Coke Morgan Stewart
*Acting Director of the United States Patent and Trademark Office*